United States Patent Office 3,812,169
Patented May 21, 1974

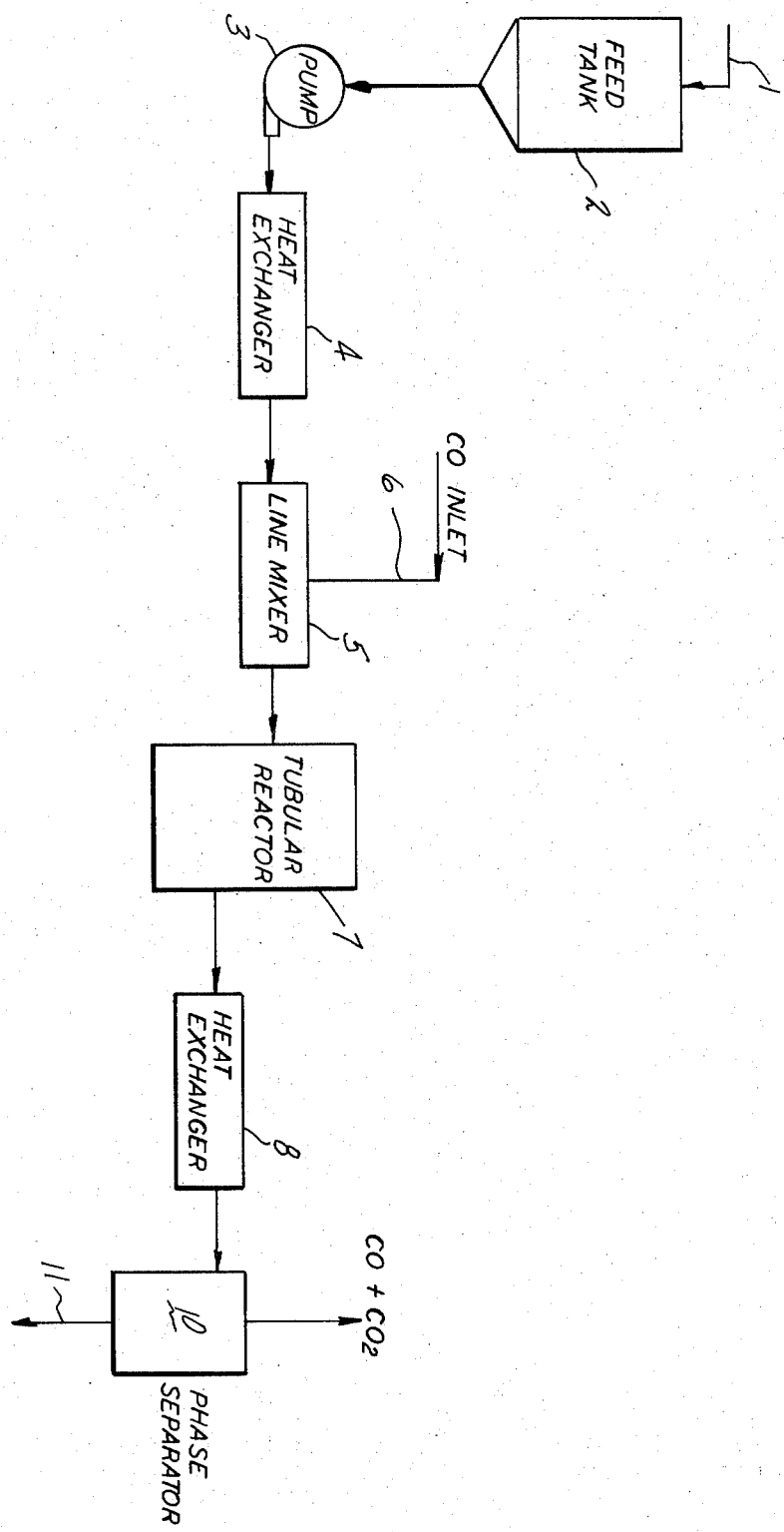

3,812,169
PREPARATION OF AROMATIC ISOCYANATES IN A TUBULAR REACTOR
Philip D. Hammond, North Haven, Conn., and John A. Scott, Joliet, Ill., assignors to Olin Corporation, New Haven, Conn.
Filed Oct. 24, 1972, Ser. No. 300,143
Int. Cl. C07c 119/04
U.S. Cl. 260—453 PC         8 Claims

ABSTRACT OF THE DISCLOSURE

Aromatic isocyanates are produced directly from aromatic nitro compounds in a continuous process in which carbon monoxide and aromatic nitro compounds are reacted in a tubular reactor in the presence of a solvent and catalyst at an elevated temperature and pressure.

---

This invention relates to a continuous process for preparing aromatic isocyanates from aromatic nitro compounds using a tubular reactor.

There is an increasing demand for organic isocyanates for use in the preparation of urethane foams and coatings, as well as in the preparation of insecticides, pesticides and the like.

Considerable effort has been expended recently in developing processes for preparing aromatic isocyanates directly from aromatic nitro compounds by reacting the aromatic nitro compound with carbon monoxide in the presence of a noble metal catalyst, particularly palladium halides and rhodium halides, and generally utilizing a co-catalyst. For example, U.S. Pat. No. 3,576,835 discloses the use of a catalyst comprised of a noble metal halide and a hetero aromatic nitrogen compound. In addition, U.S. Pat. No. 3,523,966 discloses the use of a noble metal based catalyst and certain non-noble metal based catalysts. Although the techniques described in these patents are useful in preparing aromatic isocyanates, there is a need for improving the economics of these techniques in order to make the process more profitable.

Generally, previous techniques have employed stirred reactors using intense agitation to produce the turbulent flow of liquid and gas needed to obtain efficient mass transfer. This involved the use of fully baffled reactors which were extremely expensive and created some mechanical handling problems and also were large in size and thus consumed large amounts of space.

Now it has been discovered, that aromatic isocyanates can be prepared in a continuous process by reacting an aromatic nitro compound with carbon monoxide in a tubular reactor in the presence of an inert organic solvent and a catalyst at an elevated temperature and pressure. The key factor in the use of this technique is the finding that carbon monoxide is soluble in the solvent at the pressures as defined to an extent necessary to allow the reaction to be carried out in the liquid phase.

The process of this invention has the desirable advantages of being continuous, employs simple and economic equipment and also involves a simplified work-up procedure for the reaction product. This process is illustrated in more detail in the accompanying Figure which is a schematic flow sheet.

Liquid feed solution (1) made up of the aromatic nitro compound, inert organic solvent and catalyst is fed into an agitated feed tank (2) and then pumped by means of a high pressure pump (3) through a heat exchanger (4) to heat the slurry to a desired elevated temperature and then to an agitated line mixer (5) where it is mixed with carbon monoxide (6) at the desired operating pressure to form a solution of carbon monoxide, aromatic nitro compound and catalyst in the inert organic solvent. This mixture then flows through a tubular reactor (7) which may be jacketed to permit effective temperature control for a predetermined holding time to complete the reaction and then goes to a heat exchanger (8) wherein the reacted suspension is cooled before flowing to a phase separator (10) wherein the gaseous portion is separated from the liquid phase. The liquid phase containing suspended catalyst is removed from the phase separator (11) and then cooled to cause crystallization of the catalyst and filtered to yield a filtrate of isocyanate in the inert organic solvent from which the isocyanate may be recovered by known methods. The solvent is recycled and the filtered cake of catalyst is either recycled or sent to a catalyst recovery operation.

In carrying out the method of this invention any aromatic nitro compound capable of being converted to an aromatic isocyanate may be employed as a reactant. As used herein, the term "aromatic nitro compound" represents those organic compounds having at least one nitro group attached directly to an aromatic hydrocarbon or carbocyclic nucleus such as benzene, naphthalene and the like, wherein the aromatic nucleus may also contain other substituents as illustrated below. Among the preferred organic nitro compounds which may be used in the practice of this invention are the nitrobenzenes, both mono- and polynitro, including isomeric mixtures thereof; the alkylnitrobenzenes, including the various nitrated toluenes and the nitrated xylenes; nitrated biphenyl and nitrated diphenylmethanes. Other preferred reactants include bis-(nitrophenoxy)alkanes and bis(nitrophenoxy) alkylene ethers. Typical examples of suitable aromatic nitro compounds which can be reacted to form isocyanates include the following:

(a) Nitrobenzene
(b) Nitronaphthalenes
(c) Nitroanthracenes
(d) Nitrobiphenyls
(e) Bis(nitrophenyl) methanes
(f) Bis(nitrophenyl) thioethers
(g) Bis(nitrophenyl) ethers
(h) Bis(nitrophenyl) sulfones
(i) Nitrodiphenoxy alkanes
(j) Nitrophenothiazines All of the aforementioned compounds may be substituted with one or more additional substituents such as nitro, alkyl, alkoxy, aryloxy, halogen, alkylthio, arylthio, carboxyalkyl, cyano, isocyanato, and the like, and employed as reactants in the novel process of this invention. Specific examples of suitable substituted-nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrobibenzyl
14. Bis(p-nitrophenyl)methane
15. Bis(2,4-dinitrophenyl)methane
16. Bis(p-nitrophenyl)ether
17. Bis(2,4-dinitrophenyl)ether
18. Bis(p-nitrophenyl)thioether 19. Bis(p-nitrophenyl)sulfone
20. Bis(p-nitrophenoxy)ethane
21. Bis(p-nitrophenoxy)diethylene ether
22. 2,4,6-Trinitrotoluene
23. 1,3,5-Trinitrobenzene
24. 1-Chloro-2-nitrobenzene
25. 1-Chloro-4-nitrobenzene
26. 1-Chloro-3-nitrobenzene
27. Nitrodiphenyl methane
28. 2-Chloro-6-nitrotoluene
29. 4-Chloro-3-nitrotoluene
30. 1-Chloro-2,4-dinitrobenzene
31. 1,4-Dichloro-2-nitrobenzene
32. α-Chloro-p-nitrotoluene
33. 1,3,5-Trichloro-2-nitrobenzene
34. 1,3,5-Trichloro-2,4-dinitrobenzene
35. 1,2-Dichloro-4-nitrobenzene
36. α-Chloro-m-nitrotoluene
37. 1,2,4-Trichloro-5-nitrobenzene
38. 1-Bromo-4-nitrobenzene
39. 1-Bromo-2-nitrobenzene
40. 1-Bromo-3-nitrobenzene
41. 1-Bromo-2,4-dinitrobenzene
42. α,α-Dibromo-p-nitrotoluene
43. α-Bromo-p-nitrotoluene
44. 1-Fluoro-4-nitrobenzene
45. 1-Fluoro-2,4-dinitrobenzene
46. 1-Fluoro-2-nitrobenzene
47. o-Nitrophenyl isocyanate
48. m-Nitrophenyl isocyanate
49. p-Nitrophenyl isocyanate
50. o-Nitroanisole
51. p-Nitroanisole
52. p-Nitrophenetole
53. o-Nitrophenetole
54. 2,4-Dinitrophenetole
55. 2,4-Dinitroanisole
56. 1-Chloro-2,4-dimethoxy-5-nitrobenzene
57. 1,4-Dimethoxy-2-nitrobenzene
58. m-Nitrobenzaldehyde
59. p-Nitrobenzaldehyde
60. p-Nitrobenzoylchloride
61. m-Nitrobenzoylchloride
62. 3,5-Dinitrobenzoylchloride
63. Ethyl p-nitrobenzoate
64. Methyl o-nitrobenzoate
65. m-Nitrobenzenesulfonylchloride
66. p-Nitrobenzenesulfonylchloride
67. o-Nitrobenzenesulfonylchloride
68. 4-Chloro-3-nitrobenzenesulfonylchloride
69. 2,4-Dinitrobenzenesulfonylchloride
70. 3-Nitrophthalic anhydride
71. p-Nitrobenzonitrile
72. m-Nitrobenzonitrile
73. 3,3'-Dimethoxy-4,4'-dinitro-biphenyl
74. 3,3'-Dimethyl-4,4'-dinitro-biphenyl
75. 2-Isocyanato-4-nitrotoluene
76. 4-Isocyanato-2-nitrotoluene In addition, isomers and mixtures of the aforesaid aromatic nitro compounds and substituted aromatic nitro compounds may also be employed, as well as homologues and other related compounds. Generally, the aromatic nitro compounds contain from 6 to 20 and preferably from 6 to 14 carbon atoms.

Any catalyst capable of enhancing the conversion of aromatic nitro compounds to aromatic isocyanates may be used in the process of this invention. Typical catalysts are mixtures or complexes of a heteroaromatic nitrogen compound and a noble metal halide or noble metal oxide of the type described in U.S. Pat. No. 3,576,835, issued Apr. 27, 1971, to Eric Smith and Wilhelm J. Schnabel. Preferred catalysts of this type include mixtures or complexes of palladium chloride or rhodium chloride with pyridine, isoquinoline, or quinoline, especially when the aromatic nitro compound is dinitrotoluene. Particularly preferred catalysts of this type include: $Pd(pyridine)_2Cl_2$, $Pd(pyridine)_2Cl_4$, $Rh(pyridine)_3Cl_3$, $Pd(isoquinoline)_2Cl_2$, $Pd(isoquinoline)_2Cl_4$ and $Rh(isoquinoline)_3Cl_3$. Other useful catalysts include the mixture of an oxide or chloride of palladium or rhodium with an oxide of vanadium or molybdenum as described in Canadian Pat. No. 802,239, issued Dec. 24, 1968, to Wilhelm J. Schnabel, Ehrenfried H. Kober and Theodore C. Kraus.

Other useful catalysts are disclosed in U.S. Pat. No. 3,523,966, which issued Aug. 11, 1970, to Gerhard F. Ottman, Ehrenfried H. Kober and David F. Gavin, which discloses a catalyst system comprised of a noble metal-based catalyst and selected organophosphorus compounds. Other useful catalyst systems are well known in the art.

Any solvent which is chemically inert to the components of the reaction system may be employed. Suitable solvents include aliphatic, cycloaliphatic, and aromatic solvents such as n-heptane, cyclohexane, benzene, toluene and xylene, and halogenated aliphatic and aromatic hydrocarbons such as dichloromethane, tetrachloroethane, monochlorobenzene, dichlorobenzene, trichlorobenzene, perchloroethylene, aromatic nitro compounds such as nitrobenzene, mixtures thereof and the like. It is preferred to employ dichlorobenzene as the solvent.

The reaction is carried out in the presence of a catalytic proportion of the catalyst system. The proportion of catalyst system is generally equivalent to from about 0.001 to about 500 percent and preferably from about 1 to about 40 percent by weight of the aromatic nitro compound. However, greater or lesser proportions may be employed if desired.

The amount of solvent which may be used is not critical and generally the weight percent of aromatic nitro compound in the solvent will be in the range from about 2.0 to about 75 percent, but greater or lesser proportions may be employed if desired.

The reaction temperature is generally maintained from about 150 to 300° C. and preferably from about 190° C. to about 250° C. The reaction pressure will be maintained at least above about 6000 p.s.i.g. and generally will be in the range of from about 6000 to about 15,000 p.s.i.g. and preferably from about 7000 to about 10,000 p.s.i.g.

The quantity of carbon monoxide in the free space of the reactor will be sufficient to maintain the desired pressure as well as provide reaction for the process, as the reaction progresses. The reaction is believed to progress in accordance with the following equation:

(I)   $R(NO_2)_n + 3nCO \rightarrow R(NCO)_n + 2nCO_2$ where R is the organic moiety of the aromatic nitro compound reactant of the type defined above, and $n$ is the number of nitro groups in the aromatic nitro compound. The total amount of carbon monoxide added during the reaction is generally from about 3 to about 50 and preferably from about 8 to about 15 moles of carbon monoxide per nitro group in the organic nitro compound. Greater or lesser amounts may be employed if desired.

The reaction time will vary widely and is dependent upon the aromatic nitro compound being reacted, temperature, pressure and on the amount of catalyst being charged, as well as the type of equipment being employed. Usually between about 6 and 120 minutes residence time in the reactor is needed to obtain the desired degree of reaction.

The following example is presented to describe the invention more fully without any intention of being limited thereby.

EXAMPLE

A suspension of 45 grams of dichlorobis(pyridine) palladium complex, $Pd(pyridine)_2Cl_2$ in 1500 grams of a 10% by weight solution of dinitrotoluene (DNT) in ortho dichlorobenzene is pumped at a rate of 5 grams per minute thru a heat exchanger maintained at 200° C. into a 300 ml. capacity heated stirred line mixer. By means of a liquid level controller, a liquid level of 150 grams of suspension is maintained and contacted with carbon monoxide gas at 8,000 p.s.i.g. to form a saturated solution equivalent to 6 mole percent DNT, 36 mole percent carbon monoxide, and 58 mole percent ortho-dichlorobenzene and fed to a tubular reactor composed of 20 ft. of ¼" stainless steel pressure tubing enclosed in a thermostatically controlled oven. The retention time at temperature of 200° C. and 8,000 p.s.i.g. is 30 minutes. The solution is then flowed through a cooling coil into a 1-gallon steel autoclave which acts as a phase separator for separating gas from the reaction products. At the end of the run the pressure is slowly released by venting to the atmosphere. The reaction products are removed and filtered, and the filtrate weighed and analyzed by vapor phase chromatography. This analysis confirmed that a significant amount of toluene-diisocyanate is obtained.

What is claimed is:

1. In a continuous process for preparing an aromatic isocyanate by reacting an aromatic nitro compound with carbon monoxide in the presence of an inert organic solvent and a catalyst, the improvement comprising carrying out said reaction in the liquid phase in a tubular reactor at a temperature of from about 150 to about 300° C. and a pressure of from about 6,000 to about 15,000 p.s.i.g.

2. The process of claim 1 wherein said temperature is from about 190 to about 250° C. and said pressure is from about 7000 to about 10,000 p.s.i.g.

3. The process of claim 2 wherein said aromatic nitro compound contains from 6 to 20 carbon atoms.

4. The process of claim 3 wherein the proportion of carbon monoxide used is from about 3 to about 50 moles of carbon monoxide per nitro group in the aromatic nitro compound.

5. The process of claim 4 wherein said catalyst is a complex of palladium chloride or rhodium chloride with pyridine, isoquinoline or quinoline.

6. The process of claim 5 wherein said aromatic nitro compound is dinitrotoluene.

7. The process of claim 6 wherein said inert organic solvent is dichlorobenzene.

8. The process of claim 7 wherein said catalyst is selected from the group constsing of $Pd(pyridine)_2Cl_2$, $Pd(pyridine)_2Cl_4$, $Rh(pyridine)_3Cl_3$, $Pd(isoquinoline)_2Cl_2$, $Pd(isoquinoline)_2Cl_4$ and $Rh(isoquinoline)_3Cl_3$.

References Cited
UNITED STATES PATENTS
3,576,835    4/1971    Smith et al. _____ 260—453

LEWIS GOTTS, Primary Examiner

D. H. TORRENCE, Assistant Examiner